(12) United States Patent
Chen et al.

(10) Patent No.: US 12,558,206 B2
(45) Date of Patent: Feb. 24, 2026

(54) DENTAL FLOSS DEVICE

(71) Applicant: ZENITHINGS SHENZHEN CO., LTD., Shenzhen (CN)

(72) Inventors: Zhi Chen, Shenzhen (CN); Xi Wang, Shenzhen (CN); Zhen Liu, Shenzhen (CN)

(73) Assignee: ZENITHINGS SHENZHEN CO., LTD., Shenzhen (CN)

( * ) Notice: Subject to any disclaimer, the term of this patent is extended or adjusted under 35 U.S.C. 154(b) by 0 days.

(21) Appl. No.: 18/561,560

(22) PCT Filed: Sep. 23, 2022

(86) PCT No.: PCT/CN2022/120836
§ 371 (c)(1),
(2) Date: Nov. 16, 2023

(87) PCT Pub. No.: WO2023/134216
PCT Pub. Date: Jul. 20, 2023

(65) Prior Publication Data
US 2024/0350242 A1 Oct. 24, 2024

(30) Foreign Application Priority Data

Jan. 14, 2022 (CN) ........................ 202220103698.X

(51) Int. Cl.
*A61C 15/04* (2006.01)
(52) U.S. Cl.
CPC .......... *A61C 15/047* (2013.01); *A61C 15/041* (2013.01); *A61C 15/043* (2013.01)
(58) Field of Classification Search
CPC .................................................. A61C 15/047
See application file for complete search history.

(56) References Cited

U.S. PATENT DOCUMENTS 3,847,167 A * 11/1974 Brien ................... A61C 15/047
132/322
4,245,658 A * 1/1981 Lecouturier ......... A61C 15/047
132/322
(Continued)

FOREIGN PATENT DOCUMENTS

CN        2320217 Y    5/1999
CN        2798868 Y    7/2006
(Continued)

OTHER PUBLICATIONS

Extended European search report for EP 22 919 851.0, prepared by the European Patent Office, mailing date Mar. 4, 2025, 9 pages.
(Continued)

*Primary Examiner* — Nicholas D Lucchesi
(74) *Attorney, Agent, or Firm* — Brooks Kushman P.C.

(57) ABSTRACT

A dental floss device, which includes a shell, a floss supply box, and a drive device; the floss supply box includes a box arranged in an accommodating cavity of the shell; a floss supply assembly mounted in the box, the floss supply assembly is capable of recovering an used floss and releasing an unused floss under driving of the drive device; a floss holder, one end of the floss holder is connected with the floss supply assembly, and another end of the floss holder is capable of extending out of the shell, the floss holder is configured to stretch a floss released by the floss supply assembly; the box, the floss supply assembly and the floss holder are made of degradable or recyclable materials.

14 Claims, 5 Drawing Sheets

(56)                  References Cited

U.S. PATENT DOCUMENTS

| | | | | |
|---|---|---|---|---|
| 4,586,521 | A | * | 5/1986 | Urso ................... A61C 15/047 |
| | | | | 132/322 |
| 4,605,025 | A | * | 8/1986 | McSpadden ......... A61C 15/047 |
| | | | | 132/322 |
| 5,060,681 | A | | 10/1991 | Westbrook et al. |
| 5,085,236 | A | | 2/1992 | Odneal et al. |
| 5,176,157 | A | | 1/1993 | Mazza |
| 5,207,773 | A | | 5/1993 | Henderson |
| 5,816,271 | A | | 10/1998 | Urso |
| 5,823,207 | A | | 10/1998 | Bushman |
| 10,034,729 | B2 | * | 7/2018 | Kozak ................. A61C 15/043 |
| 2004/0040571 | A1 | | 3/2004 | Williams, Sr. et al. |
| 2008/0289648 | A1 | | 11/2008 | Liu |
| 2016/0361148 | A1 | | 12/2016 | Lu |
| 2018/0140397 | A1 | | 5/2018 | Kozak |
| 2020/0221861 | A1 | | 7/2020 | Chiba et al. |
| 2021/0401555 | A1 | | 12/2021 | Chen |

FOREIGN PATENT DOCUMENTS

| | | | |
|---|---|---|---|
| CN | 101234039 | A | 8/2008 |
| CN | 209269942 | U | 8/2019 |
| CN | 111658206 | A | 9/2020 |
| CN | 112043439 | A | 12/2020 |
| CN | 113081350 | A | 7/2021 |
| CN | 217366151 | U | 9/2022 |
| JP | H04218152 | A | 8/1992 |
| JP | H1133043 | A | 2/1999 |
| JP | 2001170083 | A | 6/2001 |
| KR | 101462916 | B1 | 11/2014 |
| KR | 102027240 | B1 | 11/2019 |

OTHER PUBLICATIONS

Office Action for Japanese JP Application No. 2023-570365, dated Aug. 19, 2024, 8 Pages.

* cited by examiner

22

24

311
31
312
30
321
32
322

10

25

21

211

A ← → A

DENTAL FLOSS DEVICE

CROSS REFERENCE TO RELATED APPLICATION

The present application is a National Stage Appl. filed under 35 USC 371 of International Patent Application No. PCT/CN2022/120836 with an international filing date of Sep. 23, 2022, designating the United States, now pending, and further claims priority to a Chinese patent application, with Application No. 202220103698.X, filed on Jan. 14, 2022; the contents of which are incorporated herein by reference.

TECHNICAL FIELD

The present application relates to the technical filed of oral cleaning, and more particularly to a dental floss device.

BACKGROUND

The description here only provides background information related to the present application and does not necessarily constitute prior art. With the strengthening of personal hygiene awareness and the emphasis on oral health, more and more people start to use a floss to deeply clean their teeth. The floss uses nylon, silk, or polyester thread to clean plaque of adjacent teeth, which is effective, especially for flat or convex tooth surfaces. At present, the floss on the market is generally mounted through a plastic handle, however, the plastic handle occupies more than 98% of the volume and weight of the entire floss structure. Moreover, most of these dental floss devices are disposable and will pollute the environment after use and disposal.

SUMMARY

An object of an embodiment of the present application is to provide a dental floss device, so as to solve the problem of environmental pollution caused due to disposal of the dental floss device after use.

In order to solve the technical problem mentioned above, the technical solution adopted by an embodiment of the present application is that:

A dental floss device is provided, which includes: a shell, a floss supply box, and a drive device; the shell is provided with an accommodating cavity;

the floss supply box includes:

a box arranged in the accommodating cavity;

a floss supply assembly mounted in the box, the floss supply assembly is capable of recovering an used floss and releasing an unused floss under driving of the drive device; and a floss holder; one end of the floss holder being connected with the floss supply assembly, and an other end of the floss holder being capable of extending out of the shell, wherein the floss holder is configured to stretch a floss released by the floss supply assembly, so that the floss is stretched at the other end of the floss holder.

In one embodiment, the floss supply assembly and the floss holder are movably arranged in the box, and the drive device is further configured to drive the floss supply assembly and the floss holder to move in the box in a reciprocating linear manner, so as to drive the other end of the floss holder to extend out of the shell or to retract in the accommodating cavity; or the box is movably arranged in the accommodating cavity, the drive device is further configured to drive the box, the floss supply assembly, and the floss holder to move in the accommodating cavity in a reciprocating linear manner, so as to drive the other end of the floss holder to extend out of the shell or to retract in the accommodating cavity.

In one embodiment, the drive device includes:

a sliding switch, slidably arranged on the shell; and a transmission mechanism, connected between the sliding switch and the floss supply assembly, and the transmission mechanism is configured to convert a reciprocating linear motion of the sliding switch into the reciprocating linear motion of the floss supply assembly and an unidirectional rotating motion of the floss supply assembly.

In one embodiment, the transmission mechanism includes:

a first transmission member, being a rotating member; the first transmission member is rotationally connected with an output shaft of the sliding switch, the first transmission member is further connected with the floss supply assembly, and the first transmission member is capable of being driven by the sliding switch to move in a reciprocating linear manner;

a second transmission member, being a linear member; the second transmission member is fixedly arranged in the accommodating cavity, and the second transmission member is extended in a direction of the reciprocating linear motion of the first transmission member; and a limiting structure, configured for limiting the first transmission member in a moving process, such that a position or a posture of the first transmission member is changed to form a transmission connection with the second transmission member, so that the first transmission member unidirectionally rotates on the second transmission member along a length extension direction of the second transmission member.

In one embodiment, the first transmission member comprises a rotating component and a connecting component that are axially connected, the rotating component is rotationally connected with the output shaft of the sliding switch, the connecting component is connected with the floss supply assembly; a peripheral surface of the rotating component is provided with first teeth arranged in a circumferential direction, the peripheral surface of the rotating component is provided with a flat surface formed by removing materials at a position of the peripheral surface where the first teeth are not arranged on; and the second transmission member comprises a linear component and second teeth arranged on the linear component along a straight line direction;

the rotating component is blocked by the limiting structure in the moving process to rotate in situ, so that the first teeth and the flat surface are arranged to be alternately corresponding to the second teeth; and the first teeth are in transmission connection with the second teeth when the first teeth are arranged to be corresponding to the second teeth; and the first transmission member maintains a straight line movement when the flat surface is arranged to be corresponding to the second teeth.

In one embodiment, the limiting structure includes a block and a convex column; the block is staggered from the rotating component along an axis direction of the rotating component, the convex column is arranged on the rotating component, the convex column is convexly arranged on an end surface of the rotating component along the axis direction, and the block and the convex column are correspondingly arranged along the axis direction of the rotating component; and the convex column is capable of being abutted against the block when the rotating component moves to a position of the block, so as to drive the rotating component to rotate.

In one embodiment, the sliding switch includes:

a first sliding button, slidably arranged on a surface of the shell; and a connecting member, including a connecting portion and a rotating shaft portion that are connected with each other; the connecting portion is connected with the first sliding button, and the rotating component is rotationally sleeved on the rotating shaft portion;

the connecting portion and the first sliding button are integrally connected; or the connecting portion and the first sliding button are separately connected.

In one embodiment, the floss supply assembly includes:

a first shaft, rotationally arranged in the box;

a second shaft, rotationally arranged in the box; and a floss, penetrated through the floss holder, an end of the floss being wound on the first shaft, and an other end of the floss being wound on the second shaft;

the first shaft is connected with the connecting component.

In one embodiment, the first shaft and the second shaft are coaxially arranged, the floss on the first shaft and the floss on the second shaft are arranged spaced away from each other along an axial direction of the first shaft; and the floss holder is located on a same side of the first shaft and the second shaft in a direction perpendicular to the axial direction of the first shaft.

In one embodiment, a center of the first shaft is provided with a mounting hole, an inner wall of the mounting hole is provided with first limiting strips, and an insertion slot is formed between two adjacent first limiting strips; an outer wall of the connecting component is provided with a plurality of second limiting strips, the plurality of second limiting strips are respectively inserted into different insertion slots, and a number of the insertion slots is greater than that of the second limiting strips.

In one embodiment, the shell includes a base and an upper cover, and the base and the upper cover are enclosed to form the accommodating cavity; an inner side of the upper cover is provided with a guide frame, the first sliding button is slidably arranged on the guide frame, and a position of the upper cover corresponding to the first sliding button is provided with a through groove.

In one embodiment, an end of the upper cover is rotationally arranged on an end of the base, an elastic member is abutted between the end of the upper cover and the end of the base, and an other end of the upper cover is capable of being separated from an other end of the base after the end of the upper cover is pressed.

In one embodiment, the drive device includes:

a second sliding button, connected with the floss holder and configured to drive the floss holder and the floss supply assembly to move in the box in a reciprocating linear manner; and a drive motor, connected with the floss supply assembly and configured to rotate unidirectionally for winding and releasing the floss.

In one embodiment, the floss holder includes two tubes and a mounting member; the two tubes are arranged opposite to each other and spaced apart; each of the two tubes is provided with a hole, the hole penetrates through two ends of the tube along a length direction of the tube, and the hole is configured for the floss to pass through; the mounting member is connected between ends of the two tubes, and other ends of the two tubes are extended out of the box; and the mounting member is detachably connected with the floss supply assembly; or the mounting member is integrally connected with the floss supply assembly.

In one embodiment, the box, the floss supply assembly and the floss holder are made of degradable or recyclable materials.

The beneficial effects of the dental floss device provided in embodiments of the present application are that the dental floss device can be used continuously for several times by arranging the floss supply assembly, and after all the flosses are used, the dental floss device can continue to be used by replacing a new floss supply box, which can not only save the cost, but also avoid the environmental pollution caused by the dental floss device discarded. At the same time, the box, the floss supply assembly and the floss holder are made of degradable materials or recyclable materials, so that even if the floss supply box is disassembled for replacement, there will be no pollution to the environment, thus the dental floss device of the present application is an environmentally friendly product. In addition, the floss supply assembly and the floss holder are integrally disposed by the box, so that the floss supply assembly and the floss holder can be assembled as a whole and can be replaced as a whole when it needs to be replaced. Further, the distance between the floss supply assembly and the floss holder is reduced, and there is no need to arrange a connection frame for the floss to pass through between the floss supply assembly and the floss holder, which makes the structure of the entire dental floss device simpler and more convenient to be assembled, and only the floss supply box needs to be replaced as a whole during the later maintenance and replacement, which is easy to reuse.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

Figure 1:
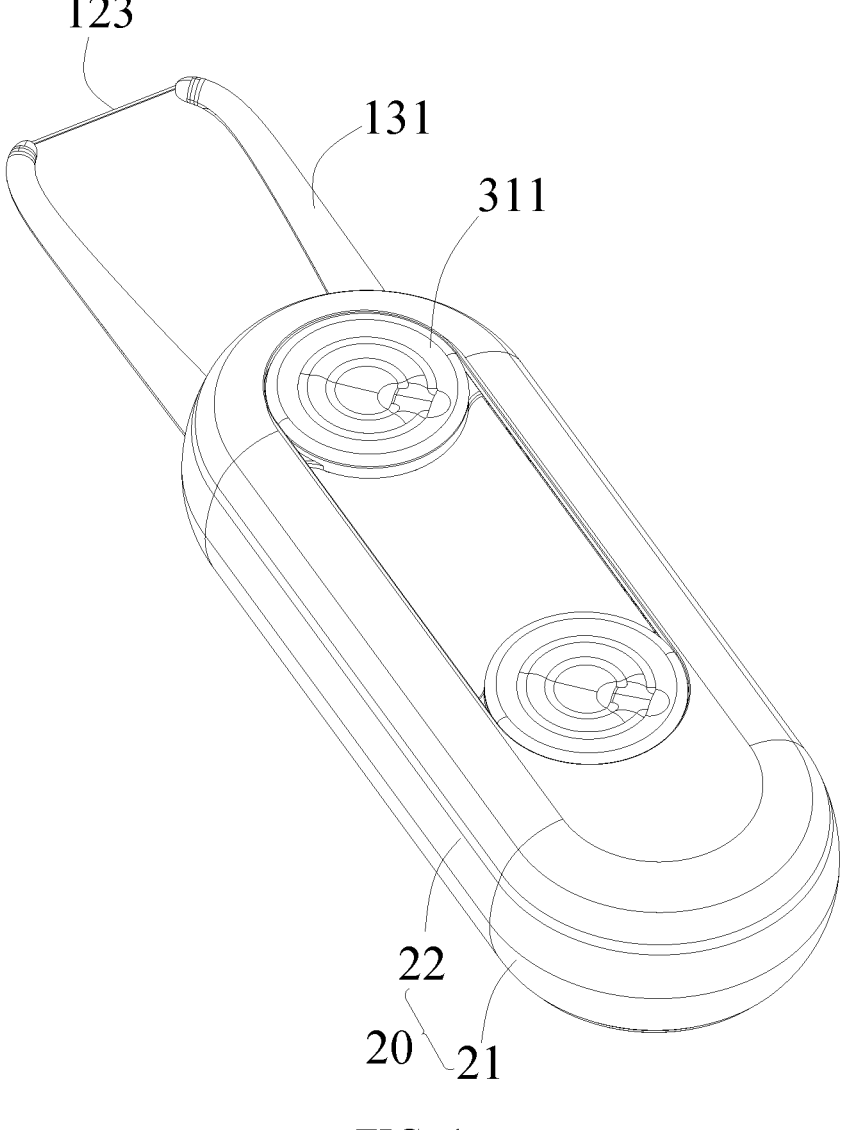
FIG. 1 is a perspective schematic view of a dental floss device provided in one embodiment of the present application.

In the drawings, the reference signs are listed:

10—floss supply box; 11—box; 111—box seat; 112—box cover; 113—mounting cavity; 12—floss supply assembly; 121—first shaft; 1211—mounting hole; 1212—first limiting strip; 1213—insertion slot; 122—second shaft; 123—floss; 13—floss holder; 131—tube; 1311—hole; 132—mounting member; 14—mounting seat; 20—shell; 21—base; 211—rotating shaft; 22—upper cover; 23—accommodating cavity; 24—guide frame; 25—elastic member; 30—drive device; 31—sliding switch; 311—first sliding button; 312—connecting member; 3121—connecting portion; 3122—rotating portion; 32—transmission mechanism; 321—first transmission member; 3211—rotating component; 3212—first teeth; 3213—straight surface; 3214—connecting component; 3215—second limiting strip; 322—second transmission member; 3221—linear component; 3222—second teeth; 323—limiting structure; 3231—block; 3232, convex column.

DETAILED DESCRIPTION OF EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component. Directions or location relationships indicated by terms such as "up", "down", "left", "right" and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application. In addition, terms "the first" and "the second" are only used in describe purposes, and should not be considered as indicating or implying any relative importance, or impliedly indicating the number of indicated technical features. In the description of the present application, "a plurality of" means two or more, unless there is additional explicit and specific limitation.

In order to illustrate the technical solution described in the present application, the followings are detailed in conjunction with specific drawings and embodiments.

An embodiment of the present application provides a dental floss device, which includes a shell 20, a floss supply box 10, and a drive device 30. The floss supply box 10 and the drive device 30 are mounted in the shell 20.

As shown in FIGS. 1 to 5, the shell 20 is provided with an accommodating cavity 23. The floss supply box 10 includes a box 11, a floss supply assembly 12, and a floss holder 13. The box 11 is mounted in the accommodating cavity 23, the floss supply assembly 12 is mounted in the box 11, the floss supply assembly 12 is capable of recovering an used floss 123 and releasing an unused floss 123 under driving of the drive device 30. One end of the floss holder 13 is connected with the floss supply assembly 12, and another end of the floss holder 13 is extended out of the shell 20, the floss holder 13 is configured to stretch a floss 123 released by the floss supply assembly 12, so that the floss 123 is stretched at the other end of the floss holder 13. The drive device 30 is used to drive the floss supply assembly 12 so that the floss supply assembly 12 can wind and release the floss 123.

In actual use, the drive device 30 drives the floss supply assembly 12 to release the initial floss 123, and this part of floss 123 is stretched by the floss holder 13. In this way, the floss 123 can be used for teeth cleaning. After being cleaned, the floss supply assembly 12 is driven by the drive device 30 to recover the used floss 123 and release a new floss 123, which is continued sequentially. When the floss supply assembly 12 is used up, remove the floss supply box 10 from the shell 20 and a new floss supply box 10 is replaced.

In addition, the box 11, the floss supply assembly 12 and the floss holder 13 of floss supply box 10 in the present application can be made of degradable or recyclable materials. That is, even if the floss supply box 10 is disassembled for replacement, it will not pollute the environment.

In the dental floss device of the present application, the dental floss device can be used continuously for several times by arranging the floss supply assembly 12, and after all the flosses are used, the dental floss device can continue to be used by replacing a new floss supply box 10, which can not only save the cost, but also avoid the environmental pollution caused by the dental floss device discarded. At the same time, the box 11, the floss supply assembly 12 and the floss holder 13 are made of degradable materials or recyclable materials, so that even if the floss supply box 10 is disassembled for replacement, there will be no pollution to the environment, thus the dental floss device of the present application is an environmentally friendly product. In addition, the floss supply assembly 12 and the floss holder 13 are integrally disposed by the box 11, so that the floss supply assembly 12 and the floss holder 13 can be assembled as a whole and can be replaced as a whole when it needs to be replaced. Further, the distance between the floss supply assembly 12 and the floss holder 13 is reduced, and there is no need to arrange a connection frame for the floss 123 to pass through between the floss supply assembly 12 and the floss holder 13, which makes the structure of the entire dental floss device simpler and more convenient to be assembled, and only the floss supply box 10 needs to be replaced as a whole during the later maintenance and replacement, which is easy to reuse.

In one embodiment, the box 11 is provided with a mounting cavity 113; the floss supply assembly 12 is detachably mounted in the mounting cavity 113, then the floss supply assembly 12 can be replaced by removing the floss supply assembly 12 from the mounting cavity 113. It is understood that in other embodiments of the present application, the box 11 can also be connected to the floss supply assembly 12 without providing the mounting cavity 113. That is, the floss supply assembly 12 is arranged as a disposable structure, and after be used, the floss supply assembly 12 and the box 11 are replaced together, and which is not limited here.

In one embodiment, the floss supply assembly 12 and the floss holder 13 are movably arranged in the box 11, the drive device 30 is further used to drive the floss supply assembly 12 and the floss holder 13 in the box 11 to move in a reciprocating linear manner, so as to drive the other end of the floss holder 13 to extend out of the shell 20 or retract into the accommodating cavity 23; the floss supply assembly 12 and the floss holder 13 are accommodated in the accommodating cavity 23 when not in use; when in use, the drive device 30 drives the floss holder 13 and the floss supply assembly 12 to move as a whole in the box 11 until the other end of the floss holder 13 extends out of the shell 20 for a preset length, then the floss 123 can be used to clean the teeth. After the device is used, the drive device 30 is driven to recycle the floss supply assembly 12 and the floss holder 13 to protect the floss holder 13 and the floss 123, so as to prevent the floss 123 from being contaminated or damaged. It is understood that in other embodiments of the present application, the box 11 can also be movably arranged in accommodating cavity 23, depending on the actual design situation and specific requirements. The drive device 30 is also used to drive the box 11, the floss supply assembly 12 and the floss holder 13 to move in accommodating cavity 23 in a reciprocating linear manner, so as to drive the other end of the floss holder 13 extending out of the shell 20 or retracting into the accommodating cavity 23. In addition, in some other embodiments, the box 11 can also be detachably mounted in the accommodating cavity 23, so that the other end of the floss holder 13 always extends out of the shell 20 and the floss 123 is stretched, which is not limited here.

Figures 2, 3:
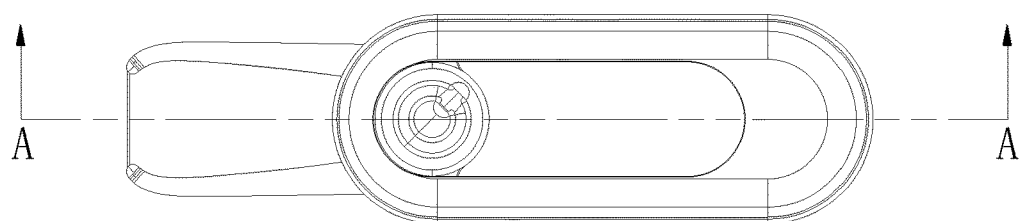
FIG. 2 is an explosive schematic view of a dental floss device provided in one embodiment of the present application.
FIG. 3 is a top schematic view of a dental floss device provided in one embodiment of the present application.

In one embodiment, as shown in FIG. 2, the drive device 30 includes a sliding switch 31 and a transmission mechanism 32. The sliding switch 31 is mounted on shell 20, and the sliding switch 31 can be slid back and forth by the user to output a reciprocating straight motion. The transmission mechanism 32 is connected between the sliding switch 31 and the floss supply assembly 12, and the transmission mechanism 32 is used to convert the reciprocating linear motion of the sliding switch 31 into a reciprocating linear motion of the floss supply assembly 12 and an unidirectional rotating motion of the floss supply assembly 12. That is, in the embodiment, the winding and releasing of the floss supply assembly 12, as well as the other end of the floss holder 13 from extending out of the accommodating cavity 23 or retracting into the accommodating cavity 23 can be realized by the sliding switch 31 in combination of the transmission mechanism 32, the operation is simple, which can be realized just sliding the sliding switch 31 on the shell 20 by the user; and the simple structure of the drive device 30 makes the structure of the entire floss device simple and occupies small space.

As shown in FIGS. 2 to 7, the transmission mechanism 32 includes a first transmission member 321, a second transmission member 322 and a limiting structure 323.

The first transmission member 321 is a rotating member, that is, the first transmission member 321 can be driven to rotate. The first transmission member 321 is connected to an output shaft of the sliding switch 31, the first transmission member 321 is also connected to the floss supply assembly 12, the first transmission member 321 can be driven by sliding switch 31 to move in the reciprocating linear manner. In addition, due that the first transmission member 321 is rotationally connected with the output shaft, when the first transmission member 321 is driven by an external force to rotate, the first transmission member 321 is also capable of rotating around the output shaft.

The second transmission member 322 is fixedly arranged, and the second transmission member 322 is a linear member. The second transmission member 322 is extended long a direction of the reciprocating straight motion direction of the first transmission member 321.

The limiting structure 323 is configured for limiting the first transmission member 321 in a moving process, such that a position or a posture of the first transmission member 321 is changed to form a transmission connection with the second transmission member 322, so that the first transmission member 321 unidirectionally rotates on the second transmission member 322 along a length extension direction of the second transmission member 322.

It should be noted that the position or a posture changing of the first transmission member 321 can be that the first transmission member 321 rotates in situ or changes the posture, or the first transmission member 321 moved axially to change the position. For example, before the first transmission member 321 meets the limiting structure 323, there is no transmission connection between the first transmission member 321 and the second transmission member 322. The first transmission member 321 is rotationally connected to the output shaft of sliding switch 31. When the linear motion of the first transmission member 321 is blocked, it is equivalent to providing an external force to the first transmission member 321 to make the first transmission member 321 rotate around the output shaft in situ, thus changing the position of the first transmission member 321, so that the first transmission member 321 can be in transmission connection with the second transmission member 322. In this way, the first transmission member 321 can rotate on the second transmission member 322 along the length direction of the second transmission member 322.

Figure 7:
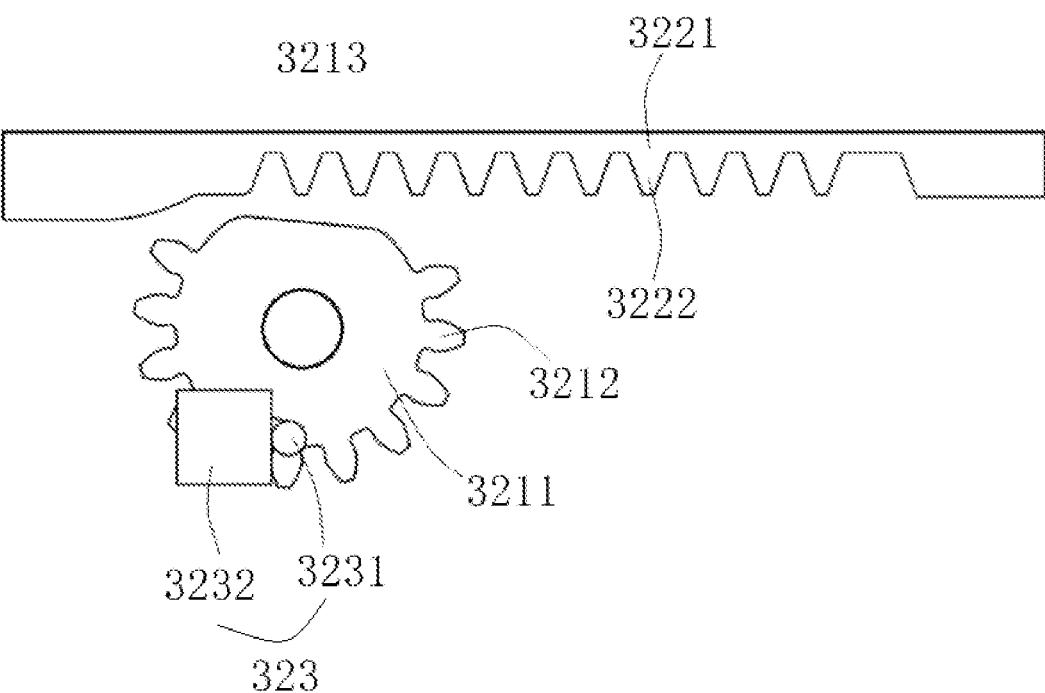
FIG. 7 is a structural schematic view of a transmission mechanism in FIG. 2.
Figure 8:
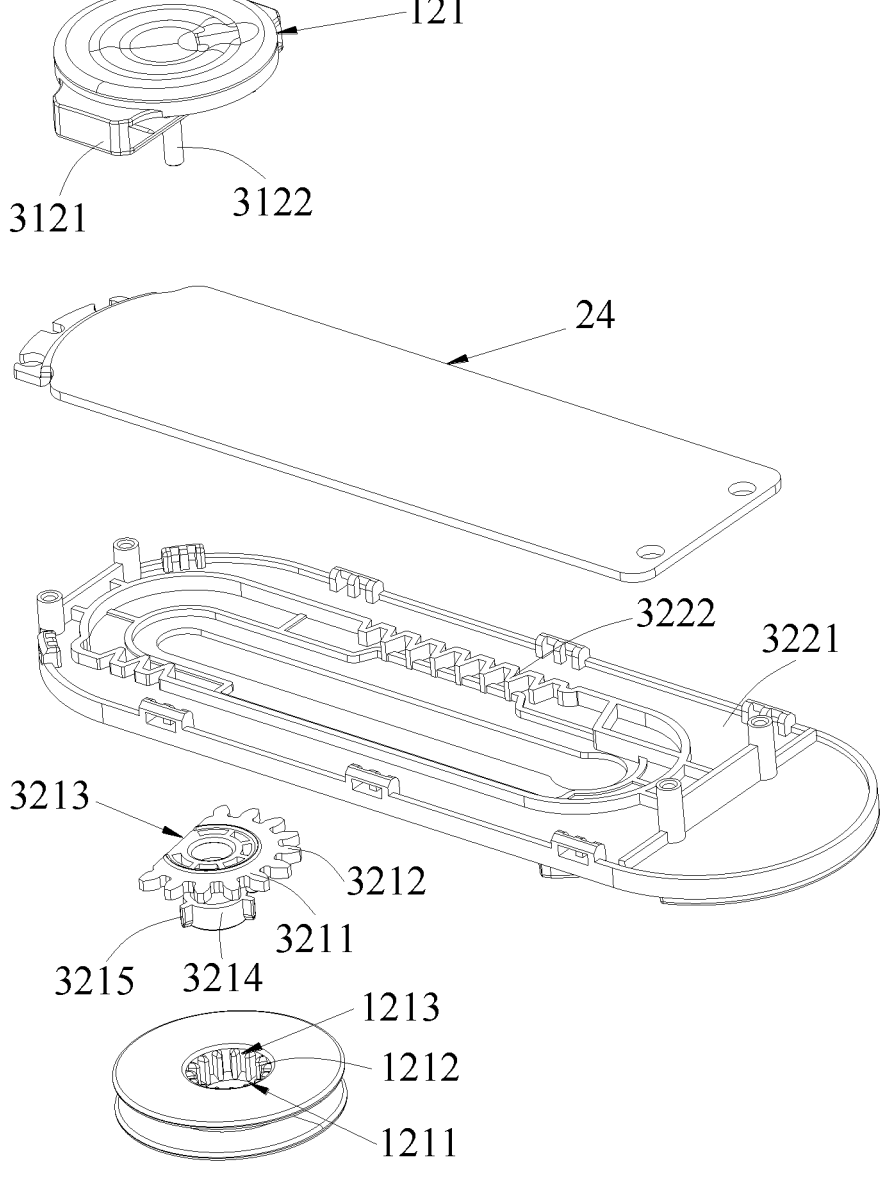
FIG. 8 is an assembled schematic view of a sliding switch, a first transmission member, a second transmission member, and a first shaft in FIG. 2.

As shown in FIGS. 7 and 8. The first transmission member 321 includes a rotating component 3211 and a connecting component 3214. The rotating component 3211 is connected to the output shaft of the sliding switch 31 and the connecting component 3214 is connected to the floss supply assembly 12. The peripheral surface of rotating component 3211 is provided with first teeth 3212 distributed peripherally, and the peripheral surface of rotating component 3211 forms a flat surface 3213 by removing materials at the position of the peripheral surface where the first teeth are not arranged on 3212. The second transmission member 322 includes a linear component 3221 and second teeth 3222, the second teeth 3222 are distributed in a straight line on the linear component 3221. The rotating component 3211 is blocked by the limiting structure 323 and rotates in situ to make the first teeth 3212 and the flat surface 3213 being arranged to be alternately corresponding to the second teeth 3222; when the first teeth 3212 are arranged to be corresponding to the second teeth 3222, the first teeth 3212 is in transmission connection with the second teeth 3222; when the flat surface 3213 is arranged to be corresponding to the second teeth 3222, the first transmission member 321 maintains a straight line motion. In the present application, the first teeth 3212 and the flat surface 3213 are distributed in the periphery of rotating component 3211, and the first teeth 3212 and the flat surface 3213 are arranged to be alternately corresponding to the second teeth 3222, so that the first transmission member 321 is discontinuously in transmission connection with the second transmission member 322; that is, the present application can realize that the first transmission member 321 is discontinuously in transmission connection with the second transmission member 322 by changing the parts of the first transmission member 321 face the second transmission member 322, the structure is simple, which does not need to provide an external auxiliary structure to drive the first transmission member 321 and second transmission member 322 to connect. It is understood that in other embodiments of the present application, the first teeth 3212 and the flat surface 3213 can also be axially distributed, depending on the actual design situation. By changing the positions of the first transmission member 321 or the second transmission member 322 along the axis direction, the first teeth 3212 and the flat surface 3213 are alternately arranged to be corresponding to the second teeth 3222. For example, an elastic member can be arranged between the rotating component 3211 and the sliding switch 31, when the rotating component 3211 moves to the limiting structure 323, the limiting structure 323 abuts against the rotating component 3211 along an axial direction, so as to change an axial position of the rotating component 3211, thus the axial positions of the first teeth 3212 and the flat surface 3213 are changed.

As shown in FIG. 7, the limiting structure 323 includes a block 3232 and a convex column 3231. The block 3232 is arranged in the shell 20, and the block 3232 and the rotating component 3211 are staggered along the axis of the rotating component 3211, the convex column 3231 is arranged on the rotating component 3211, and the convex column 3231 is arranged on the axial end surface of the rotating component 3211, that is, the convex column 3231 and the rotating component 3211 are staggered along the axis. The block 3232 and the convex column 3231 are arranged along the axis of the rotating component 3211, then when the rotating component 3211 moves to the position of the block 3232, the convex column 3231 and the block 3232 abut against each other, thus the rotating component 3211 is driven to rotate. In the embodiment, there is no need to additionally provide a drive structure to change the position of the first transmission member 321 or the second transmission member 322, the rotation of the rotating component 3211 can be achieved by the mutually contact between the block 3232 and the convex column 3231, and the drive of the drive device 30, thereby driving the first transmission member 321 and the second transmission member 322 to convert from a unconnected relationship to a mutually transmitted connection state. The structure is simple, the assembly is simple, and the production process is simple.

As shown in FIGS. 2 and 8, the sliding switch 31 includes a first sliding button 311 and a connecting member 312, the first sliding button 311 is slidably arranged on the surface of shell 20, the connecting member 312 includes a connecting portion 3121 and a rotating shaft portion 3122, and the connecting portion 3121 is connected with the first sliding button 311, the rotating component 3211 is rotationally sleeved on the rotating component 3122. When the first sliding button 311 is slid on the surface of the shell 20, the first transmission member 321 is driven by the connecting portion 3121 and the rotating shaft portion 3122 to move in the reciprocating linear manner. With the cooperation of the second transmission member 322 and the limiting structure 323, the floss supply assembly 12 is moved in the reciprocating linear manner and the first transmission member 321 is move in a unidirectional rotating manner.

In one embodiment, as shown in FIG. 2, the connecting portion 3121 and the first sliding button 311 are integrally connected, that is, connecting member 312 and the first sliding button 311 are integrally connected, so that connecting member 312 and the first sliding button 311 can be processed together, which simplifies the manufacturing process and assembly process of connecting member 312 and the first sliding button 311. It is understood that in other embodiments of the present application, the connection portion 3121 and the first sliding button 311 can also be connected separately, that is, the connecting member 312 and the first sliding button 311 are made separately and then fixed together, and which is not limited here.

Figure 5:
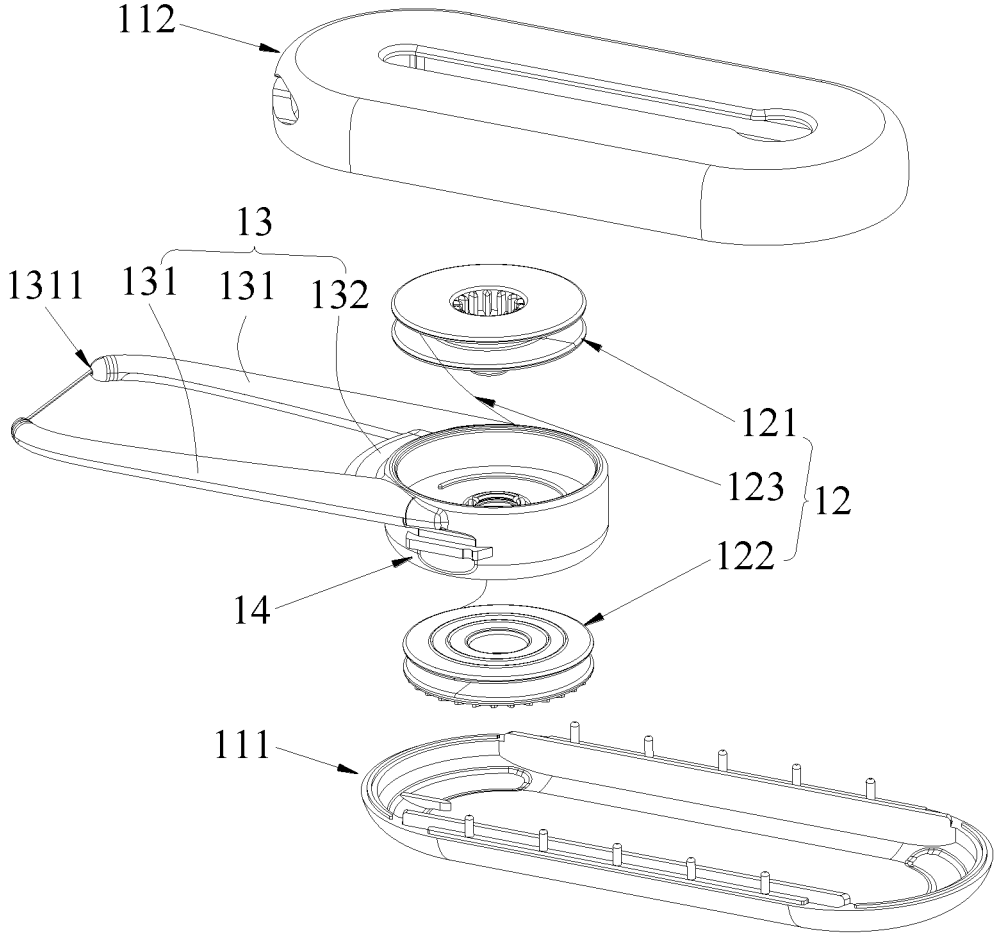
FIG. 5 is an explosive schematic view of a floss supply box in FIG. 2.
Figure 6:
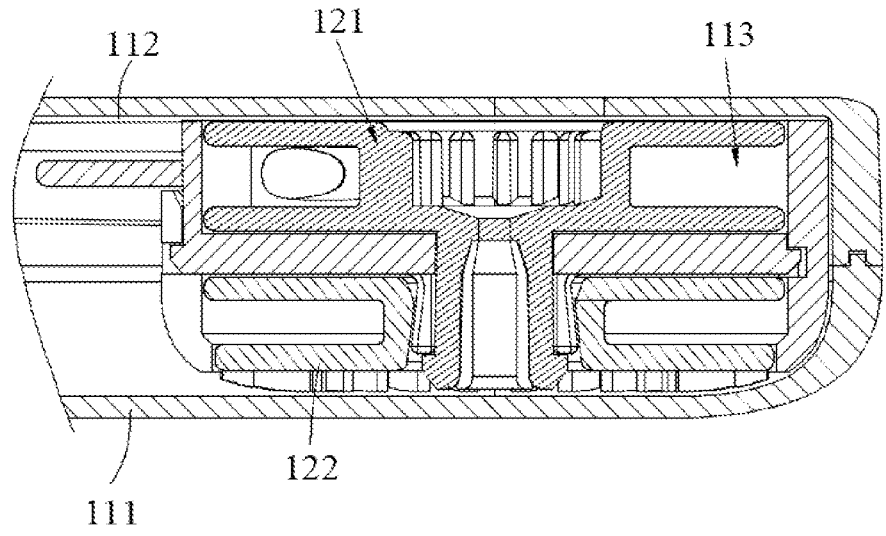
FIG. 6 is a cross-sectional schematic view of the floss supply box in FIG. 5.

As shown in FIGS. 5 and 6, the floss supply assembly 12 includes a first shaft 121, a second shaft 122 and a floss 123; the first shaft 121 is rotationally arranged in the box 11, the second shaft 122 is rotationally arranged in the box 11, the floss 123 penetrates through the floss holder 13, and one end of the floss 123 is wound around the first shaft 121, the other end of floss 123 is wound around the second shaft 122. During mounting, the first shaft 121 is connected to the connecting component 3214, the unused floss 123 is wound around the first shaft 121, and the used floss 123 is wound around the second shaft 122. After each use of the floss 123, the first sliding button 311 is slid to drive the first shaft 121 to rotate through the connecting member 312, the rotating component 3211 and the connecting component 3214, so as to release the unused floss 123. In the present application, the design of first shaft 121 and second shaft 122 enables the unused floss 123 to be fully separated from the used floss 123, so as to prevent the used floss 123 from polluting the unused floss 123. It is understood that in other embodiments of the present application, the floss supply assembly 12 can also include only one shaft according to the actual design requirements, and the unused floss 123 and the used floss 123 are wound on opposite ends of the shaft respectively. The unused floss 123 is separated from the used floss 123 by a separating plate, which is not limited here.

In one embodiment, as shown in FIGS. 5 and 6, the first shaft 121 and the second shaft 122 are coaxially arranged, the floss 123 on the first shaft 121 and the floss 123 on the second shaft 122 are arranged spaced apart along the axial direction of the first shaft 121. The floss holder 13 is located on the same side of the first shaft 121 and the second shaft 122 in a direction perpendicular to the axial direction of the first shaft 121, which facilitates the penetration of the floss 123 from first shaft 121 into the floss holder 13, and facilitates the winding of the floss 123 from the floss holder 13 onto the second shaft 122. The overall structure of the first shaft 121, the second shaft 122 and the floss holder 13 is compact and occupies a small space, such that the entire floss supply box 10 occupy a small space, so that the structure of the dental floss device is small and is easy to carry.

As shown in FIG. 8, the center of the first shaft 121 is provided with a mounting hole 1211, and the inner wall of the mounting hole 1211 is provided with a plurality of first limiting strips 1212 distributed in a circumferential direction. The first limiting strips 1212 are extended along an axial direction of the mounting hole 1211, and an insertion slot 1213 is formed between two adjacent first limiting strips 1212. The outer wall of the connecting component 3214 is provided with a plurality of second limiting strips 3215, the plurality of second limiting strips 3215 are respectively inserted into different insertion slots 1213. When the connecting component 3214 is inserted into the mounting hole 1211, the second limiting strips 3215 are inserted into the insertion slots 1213 to form a plug-in corporation, so as to realize the circumferential limitation of the first shaft 121 and the connecting component 3214, when connecting component 3214 rotates to drive the first shaft 121 to rotate, and then realize the release and recovery of the floss. It is understood that in other embodiments of the present application, the first shaft 121 can also form a connection with the connecting component 3214 by way of a key connection, an interference fit connection or a screw locking connection, which is not limited here.

A number of the insertion slots 1213 is greater than that of the second limiting strips 3215, then one of the second limiting strips 3215 can be inserted into different insertion slots 1213 for easy assembly.

Figure 4:
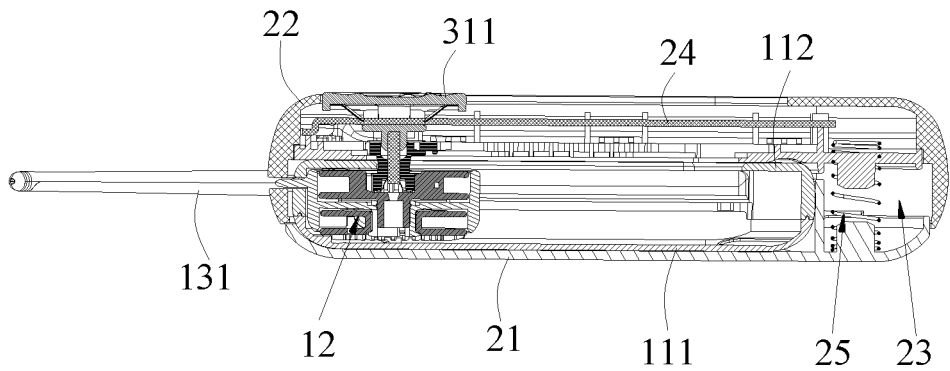
FIG. 4 is a cross-sectional schematic view taken along a line A-A in FIG. 1.

In one embodiment, as shown in FIGS. 2 and 4, the shell 20 includes a base 21 and an upper cover 22, the base 21 and the upper cover 22 are enclosed to form the accommodating cavity 23; the box 11, the floss supply assembly 12 and the floss holder 13 are accommodated in the accommodating cavity 23. The inner side of the upper cover 22 is provided with a guide frame 24, the first sliding button 311 is slidably arranged on the guide frame 24, a position of the upper cover 22 corresponding to the first sliding button 311 is provided with a through groove, the first sliding button 311 penetrates the through groove to be exposed to the outside for the user to slide. In the present application, the arrangement of the slide frame 24 can guide and limit the sliding of the first sliding button 311.

In one embodiment, as shown in FIGS. 2 and 4, one end of the upper cover 22 is rotationally arranged on one end of the base 21, and an elastic member 25 is abutted against between the end of the upper cover 22 and the end of the base 21, and the other end of the upper cover 22 can be separated from the other end of base 21 after the end of the upper cover 22 is pressed. Specifically, the elastic member 25 is arranged in the accommodating cavity 23, the elastic member 25 is a compression spring, a bottom end of the elastic member 25 is fixedly connected with an inner wall of one end of the base 21, a top end of the elastic member 25 is fixedly connected with an inner wall of one end of the upper cover 22; when the upper cover 22 and the base 21 are covered to each other, the elastic member 25 is in a natural expansion state, when the end of the upper cover 22 is pressed, the end of the upper cover 22 is rotated until the other end of the upper cover 22 is separated from the other end of the base 21, so as to facilitate taking out of the floss supply box 10, at this time, the elastic member 25 is in a compressed state and accumulates elastic force; when the external force on the end of the upper cover 22 disappears, the end of the upper cover 22 moves upward under the elastic force of the elastic member 25 to drive the upper cover 22 to reversely rotate until the upper cover is covered on the base 21. The shell 20 of the embodiment is designed such that the user can quickly and easily open the upper cover 22 and take out the floss supply box 10.

As shown in FIG. 2, the base 21 is provided with two rotating shafts 211 arranged coaxially and extended opposite to each other, positions of the inner wall of the upper cover 22 corresponding to the two rotating shafts 211 are respectively provided with a shaft hole. During mounting, the two rotating shafts 211 are respectively inserted into the two shaft holes, so as to realize a rotating connection of the upper cover 22 on the base 21.

In one embodiment, as shown in FIG. 5, the floss holder 13 includes two tubes 131 and a mounting member 132; the two tubes 131 are arranged opposite to each other and spaced apart. Each of the two tubes 131 is provided with a hole 1311, and the hole 1311 penetrates through the opposite ends of the tube 131 along a length extending direction of the tube 131, and the hole 1311 is used for the floss 123 passing through therein. The mounting member 132 is connected between same ends of the two tubes 131, the mounting member 132 and the same ends of the two tubes 131 are accommodated in the box 11, and the other same ends of the two tubes 131 are extended out of the box 11. The mounting member 132 is provided with a mounting structure used for forming a detachable connection with the floss supply assembly 12. In the present application, the same ends of the two tubes 131 are fixedly connected through the mounting member 132, and with the mounting member 132 providing with the mounting structure, so that the detachable connection of the mounting member 132 with the floss supply assembly 12 can be formed, thus the floss holder 13 is easy to be disassembled and assembled, which facilitates subsequent maintenance or replacement. In addition, the hole 1311 is arranged penetrating through the opposite ends of the tube 131, such that the floss 123 is protected in the hole 1311 except for the part used for cleaning teeth, which not only keeps the floss 123 clean and free from dust before use, but also prevents the floss 123 from being damaged before use, thus ensure that the floss 123 functions properly. It is understood that, in other embodiments of the present application, the mounting member 132 can also be integrally connected with floss supply assembly 12, in particular, the floss supply assembly 12 also includes a mounting seat 14, the first shaft 121 and the second shaft 122 are mounted in the inner cavity of the mounting seat 14, and the mounting member 132 is integrally connected to the mounting seat 14 such that the connection between the floss supply assembly 12 and the floss holder 13 is more secure.

As shown in FIG. 5, the box 11 includes a box seat 111 and a box cover 112. Edges of the box seat 111 and box cover 112 are interlocked and enclosed to form the mounting cavity 113.

In some other embodiments of the present application, the drive device 30 can also include a second sliding button and a drive motor, the second sliding button is connected to the floss holder 13. The second sliding button is used to slide to drive the floss supply assembly 12 and the floss holder 13 moving in the accommodating cavity 23 in a reciprocating linear manner. The drive motor is connected to the floss supply assembly 12, and the drive motor is used to drive the floss supply assembly 12 to unidirectionally rotates to release and wind the floss. That is, the reciprocating linear motion of the floss holder 13 and the winding and releasing of the floss supply assembly 12 are respectively driven by the second sliding button and the drive motor.

The aforementioned embodiments are only preferred embodiments of the present invention, and should not be regarded as being limitation to the present invention. Any modification, equivalent replacement, improvement, and so on, which are made within the principle of the present invention, should be included in the protection scope of the present invention.

What is claimed is:

1. A dental floss device, comprising:
a shell, provided with an accommodating cavity;
a drive device; and
a floss supply box, comprising:
a box, arranged in the accommodating cavity;
a floss supply assembly, mounted in the box, wherein the floss supply assembly is capable of recovering a used floss and releasing an unused floss under driving of the drive device; and
a floss holder, one end of the floss holder being connected with the floss supply assembly, and another end of the floss holder being capable of extending out of the shell, wherein the floss holder is configured to stretch a floss released by the floss supply assembly, so that the floss is stretched at the other end of the floss holder;
wherein the floss supply assembly and the floss holder are movably arranged in the box, and the drive device is further configured to drive the floss supply assembly and the floss holder to move in the box in a reciprocating linear manner, so as to drive the other end of the floss holder to extend out of the shell or to retract in the accommodating cavity; or
the box is movably arranged in the accommodating cavity, the drive device is further configured to drive the box, the floss supply assembly, and the floss holder to move in the accommodating cavity in a reciprocating linear manner, so as to drive the other end of the floss holder to extend out of the shell or to retract in the accommodating cavity.

2. The dental floss device according to claim 1, wherein the drive device comprises:

a sliding switch, slidably arranged on the shell; and a transmission mechanism, connected between the sliding switch and the floss supply assembly, wherein the transmission mechanism is configured to convert a reciprocating linear motion of the sliding switch into a reciprocating linear motion of the floss supply assembly and an unidirectional rotating motion of the floss supply assembly.

3. The dental floss device according to claim 2, wherein the transmission mechanism comprises:

a first transmission member, being a rotating member; the first transmission member is rotationally connected with an output shaft of the sliding switch, the first transmission member is further connected with the floss supply assembly, and the first transmission member is capable of being driven by the sliding switch to move in a reciprocating linear manner;

a second transmission member, being a linear member; the second transmission member is fixedly arranged in the accommodating cavity, and the second transmission member is extended in a direction that the first transmission member is moved in the reciprocating linear manner; and a limiting structure, configured for limiting the first transmission member in a moving process, such that a position or a posture of the first transmission member is changed to form a transmission connection with the second transmission member, so that the first transmission member unidirectionally rotates on the second transmission member along a length extension direction of the second transmission member.

4. The dental floss device according to claim 3, wherein the first transmission member comprises a rotating component and a connecting component that are axially connected, the rotating component is rotationally connected with the output shaft of the sliding switch, the connecting component is connected with the floss supply assembly; a peripheral surface of the rotating component is provided with first teeth arranged in a circumferential direction, the peripheral surface of the rotating component is provided with a flat surface formed by removing materials at a position of the peripheral surface where the first teeth are not arranged on; and the second transmission member comprises a linear component and second teeth arranged on the linear component along a straight line direction;

the rotating component is blocked by the limiting structure in a moving process to rotate in situ, so that the first teeth and the flat surface are arranged to be alternately corresponding to the second teeth; and the first teeth are in a transmission connection with the second teeth when the first teeth are arranged to be corresponding to the second teeth; and the first transmission member maintains a straight line movement when the flat surface is arranged to be corresponding to the second teeth.

5. The dental floss device according to claim 4, wherein the limiting structure comprises a block and a convex column; the block is staggered from the rotating component along an axis direction of the rotating component, the convex column is arranged on the rotating component, the convex column is convexly arranged on an end surface of the rotating component along the axis direction, and the block and the convex column are correspondingly arranged along the axis direction of the rotating component; and the convex column is capable of being abutted against the block when the rotating component moves to a position of the block, so as to drive the rotating component to rotate.

6. The dental floss device according to claim 4, wherein the sliding switch comprises:

a first sliding button, slidably arranged on a surface of the shell; and a connecting member, comprising a connecting portion and a rotating shaft portion that are connected with each other; the connecting portion is connected with the first sliding button, and the rotating component is rotationally sleeved on the rotating shaft portion;

wherein the connecting portion and the first sliding button are integrally connected; or the connecting portion and the first sliding button are separately connected.

7. The dental floss device according to claim 6, wherein the shell comprises a base and an upper cover, and the base and the upper cover are enclosed to form the accommodating cavity; an inner side of the upper cover is provided with a guide frame, the first sliding button is slidably arranged on the guide frame, and a position of the upper cover corresponding to the first sliding button is provided with a through groove.

8. The dental floss device according to claim 7, wherein an end of the upper cover is rotationally arranged on an end of the base, an elastic member is abutted between the end of the upper cover and the end of the base, and another end of the upper cover is capable of being separated from another end of the base after the end of the upper cover is pressed.

9. The dental floss device according to claim 7, wherein the drive device comprises:

a second sliding button, connected with the floss holder and configured to drive the floss holder and the floss supply assembly to move in the box in a reciprocating linear manner; and a drive motor, connected with the floss supply assembly and configured to rotate unidirectionally for winding and releasing the floss.

10. The dental floss device according to claim 4, wherein the floss supply assembly comprises:

a first shaft, rotationally arranged in the box;

a second shaft, rotationally arranged in the box; and a floss, penetrated through the floss holder, with an end of the floss being wound on the first shaft and another end of the floss being wound on the second shaft;

wherein the first shaft is connected with the connecting component.

11. The dental floss device according to claim 10, wherein the first shaft and the second shaft are coaxially arranged, the floss on the first shaft and the floss on the second shaft are arranged spaced away from each other along an axial direction of the first shaft; and the floss holder is located on a same side of the first shaft and the second shaft in a direction perpendicular to the axial direction of the first shaft.

12. The dental floss device according to claim 10, wherein a center of the first shaft is provided with a mounting hole, an inner wall of the mounting hole is provided with first limiting strips, and an insertion slot is formed between two adjacent first limiting strips; an outer wall of the connecting component is provided with a plurality of second limiting strips, the plurality of second limiting strips are respectively inserted into different insertion slots, and a number of the insertion slots is greater than that of the second limiting strips.

13. The dental floss device according to claim 1, wherein the floss holder comprises two tubes and a mounting member; the two tubes are arranged opposite to each other and spaced apart; each of the two tubes is provided with a hole, the hole penetrates through two ends of the tube along a length direction of the tube, and the hole is configured for the floss to pass through; the mounting member is connected between ends of the two tubes, and other ends of the two tubes are extended out of the box; and the mounting member is detachably connected with the floss supply assembly; or the mounting member is integrally connected with the floss supply assembly.

14. The dental floss device according to claim 1, wherein the box, the floss supply assembly and the floss holder are made of degradable or recyclable materials.

\*   \*   \*   \*   \*